United States Patent [19]

Barnebey

[11] 3,771,661
[45] Nov. 13, 1973

[54] MULTIPLE FLUID FILTER PLATE ASSEMBLY

[75] Inventor: Herbert L. Barnebey, Columbus, Ohio

[73] Assignee: Barnebey-Cheney Co., Columbus, Ohio

[22] Filed: July 13, 1971

[21] Appl. No.: 162,120

[52] U.S. Cl............... 210/240, 55/387, 55/419, 55/484, 55/502, 55/511, 161/18, 210/489
[51] Int. Cl... B01d 25/08, B01d 50/00, B01d 46/12
[58] Field of Search................... 210/231, 232, 228, 210/488, 489, 240; 55/485, 500, 502, 501, 387, 419, 484, 511; 161/18, 41-45, 109-115; 56/63; 35/26; 40/152

[56] References Cited
UNITED STATES PATENTS

| 2,480,732 | 8/1949 | Hendrickson | 210/231 X |
| 3,655,060 | 4/1972 | Hagdahl | 55/500 |
| 3,242,649 | 3/1966 | Rivers | 55/50 X |
| 2,499,949 | 3/1950 | Glanzer et al. | 55/502 |
| 3,242,656 | 3/1966 | Murphy, Jr. | 55/500 |
| 930,561 | 8/1909 | Rahe | 55/500 X |
| 3,434,269 | 3/1969 | Hyatt | 210/232 |
| 3,241,678 | 3/1966 | Wrotnowski | 210/226 X |

Primary Examiner—Frank A. Spear, Jr.
Assistant Examiner—T. A. Granger
Attorney—Wm. Henry Venable

[57] ABSTRACT

This disclosure pertains to the construction of assemblies of panel-type adsorbers or filters for fluids using components readily standardized to facilitate a variety of available flow patterns assembled in a housing. The adsorber or filter panels may be of any desired shape and area, the most common shape commercially available today being rectangular or square but this disclosure shows in addition circular and hexagonal panels. The assembly includes a pair of seals between the panels and the housing dividing the inlet zone from the outlet zone and a variety of gasket units which may be standardized to permit selections providing any combination of series and/or parallel flow through predetermined numbers of panels.

6 Claims, 12 Drawing Figures

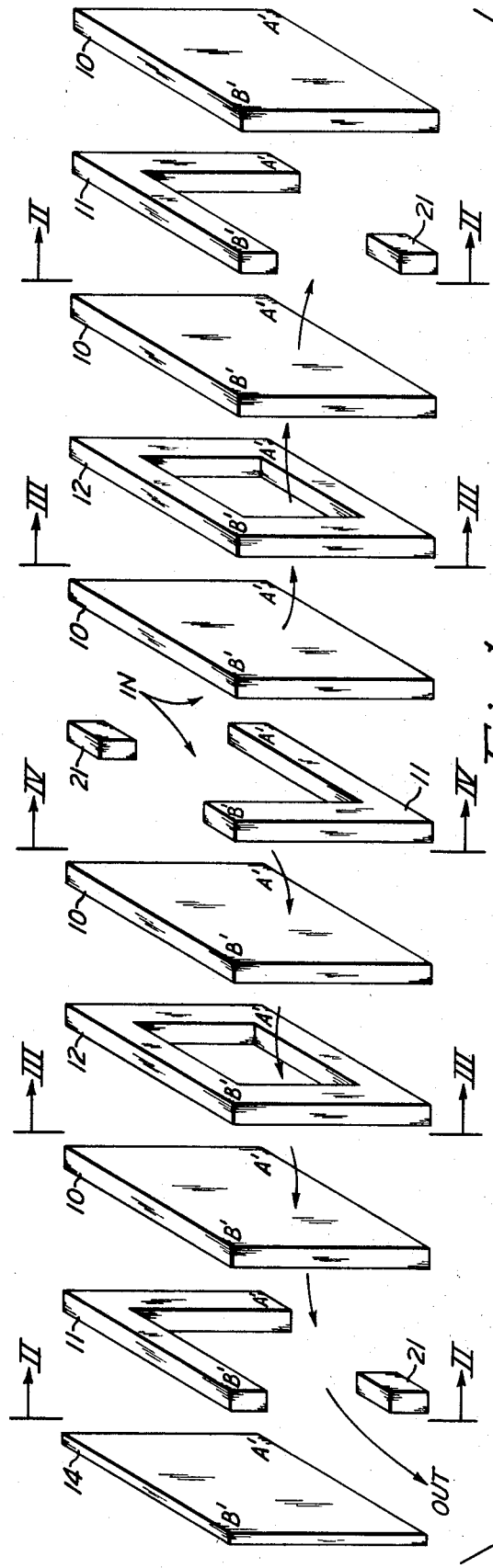
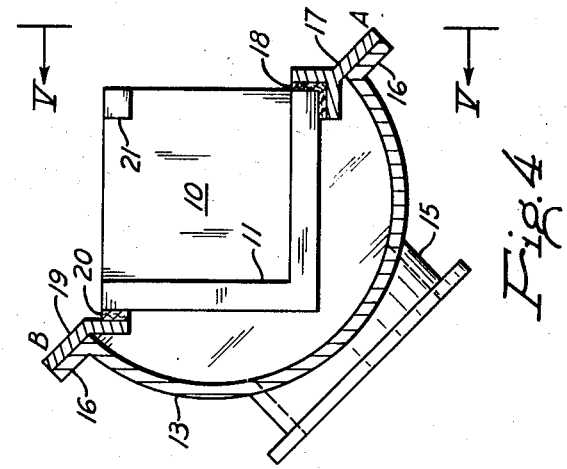
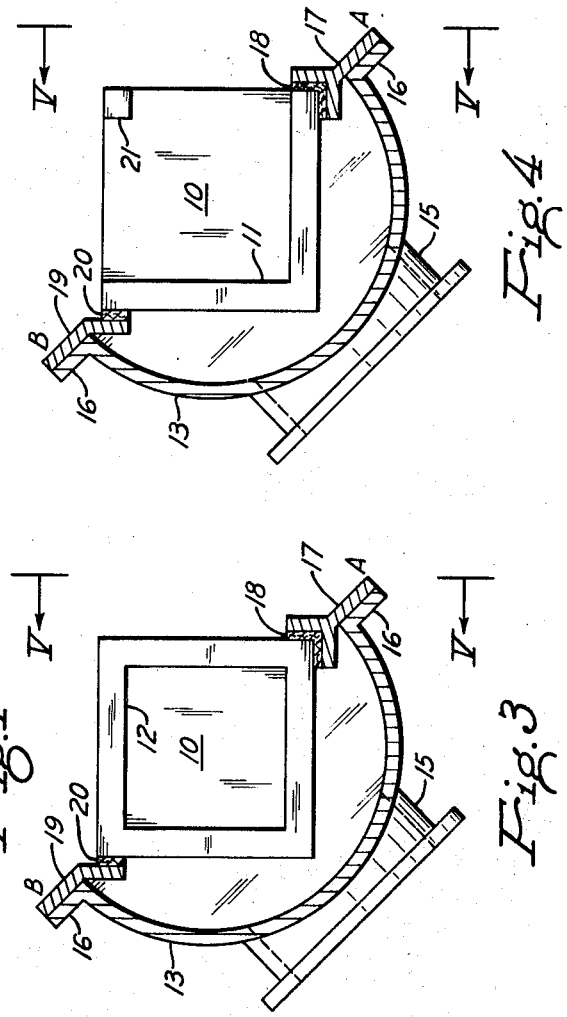
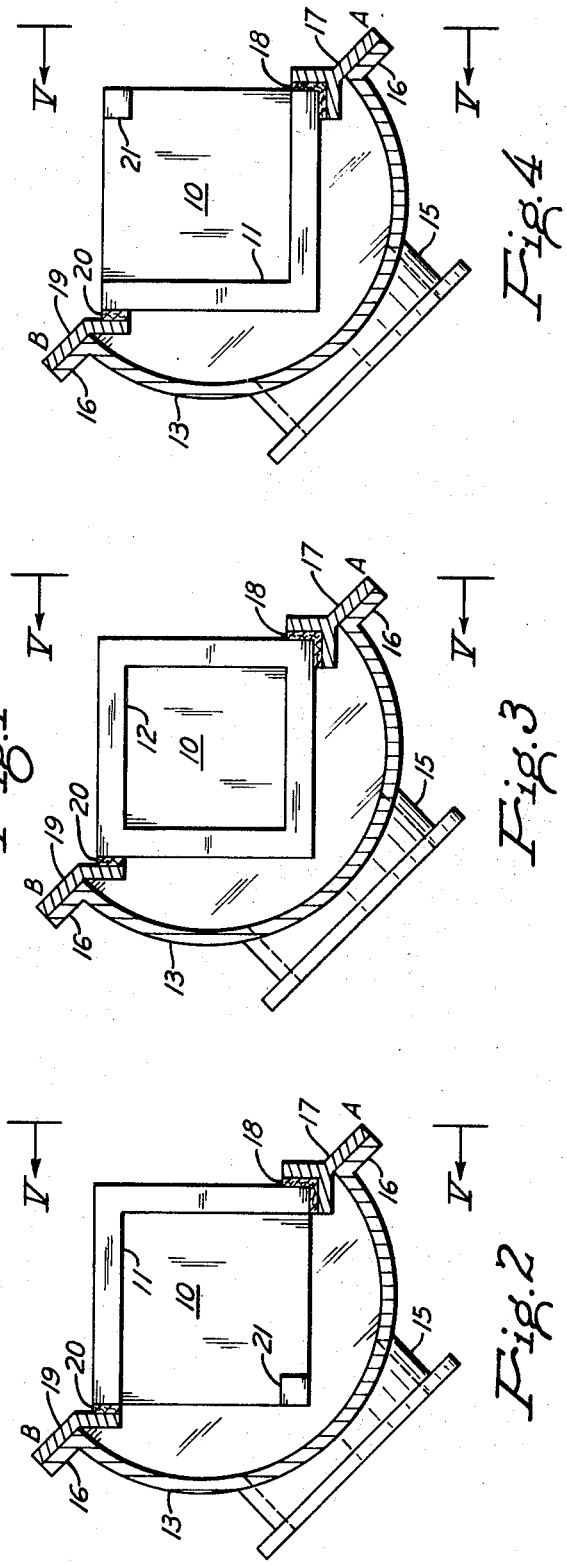

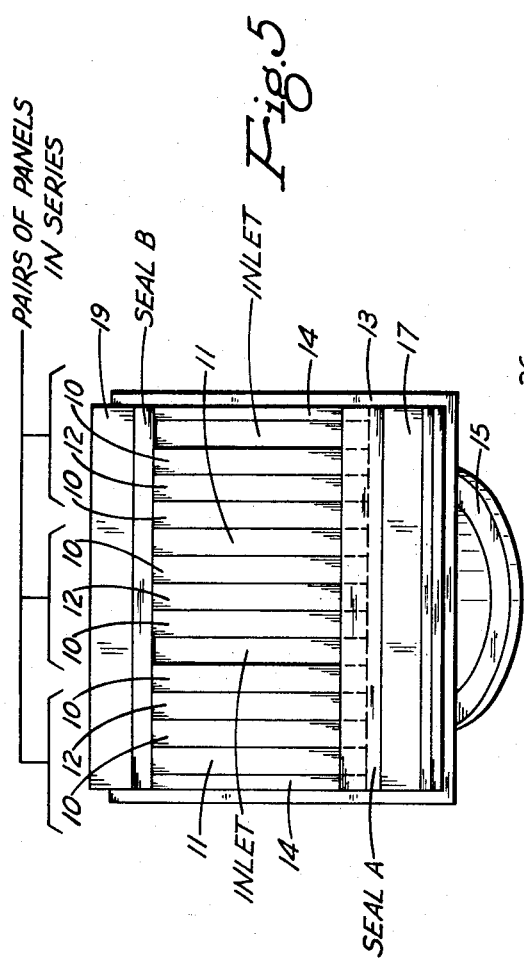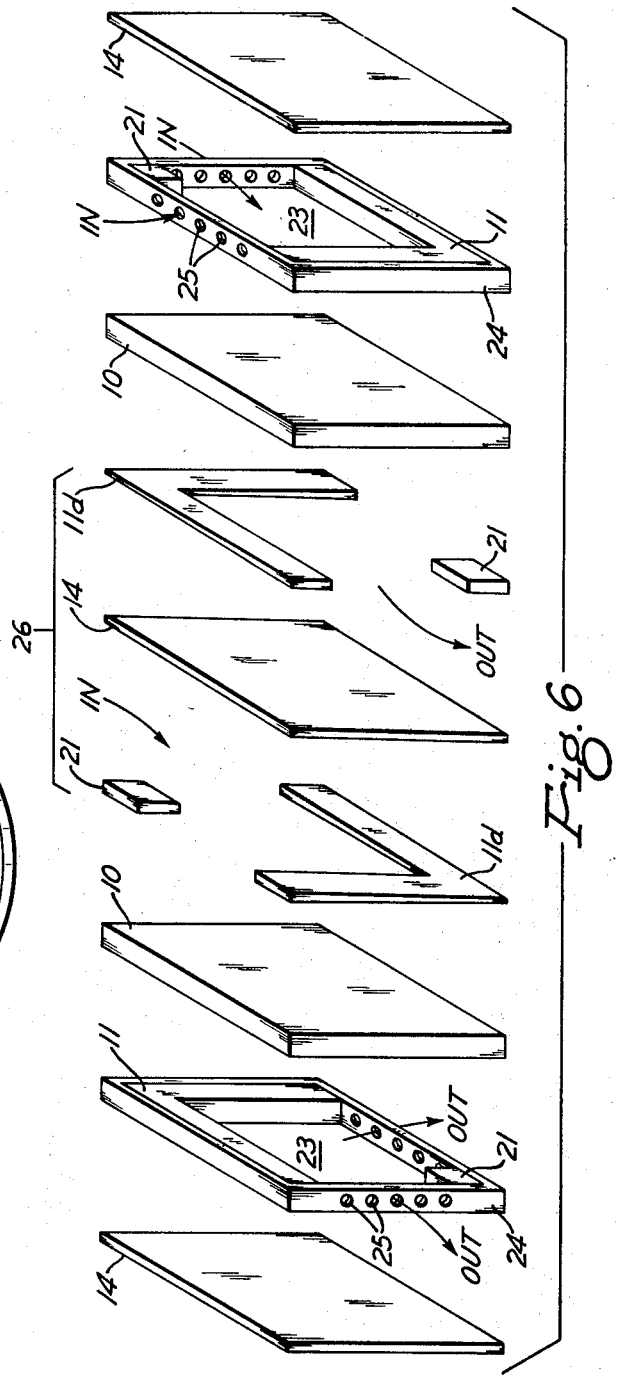

MULTIPLE FLUID FILTER PLATE ASSEMBLY

SUMMARY OF THE INVENTION

This invention relates to sets or stacks of standardized or standardizable filter, adsorber, catalyst, heat exchange, or other fluid treatment panels, between a pair of seals dividing the inlet and outlet sides of the set or stack, including a variety of standardizable gasket forms between adjacent panels in such sets, extending along the periphery of the panels between the seals.

The object of the invention is to render it possible to assemble, using standardized components, a stack or set of any number of panels providing any desired pattern of fluid flow (series or parallel) through any predetermined number of panels.

Sets of air filters with parallel flow through adjacent filters are old in the art. Kutsche U.S. Pat. No. 296,758 for a Dust Arrester, issued Apr. 15, 1884, discloses a stack of rectangular screens providing parallel flow of air through all the screens of the series, intended to clean the exhaust air discharged by the blower into the shavings room of a cabinet or other wood-working shop. Hechenbleikner U.S. Pat. No. 1,929,246 for Apparatus for Treating Gaseous Products discloses a cylindrical stack of circular filters, each of annular shape, opening into an axially central duct at the inside and a peripheral duct at the outer casing wall, also providing parallel flow through all the filters, the air flowing radially between adjacent filters. Such prior art points out the advantages of stacked panels in general and certain specific suggestions for providing parallel flow through adjacent panels, but it fails to solve the problem of a system admitting the use of the standard panels commercially available in any desired combination of types and flow patterns. My invention solves this long-standing problem and provides a selection of standardizable auxiliary components including housings and gasket assemblies designed to fit to standardized panels and permitting the rapid assembly of any desired combination from stocked standardized components or parts.

This object is realized by embodying in the housing for a stack of spaced-apart, fluid treatment panels of standard sizes and congruent shape, a pair of spaced seals extending longitudinally from end to end of the stack of panels and separating the fluid inlet zone from the fluid outlet zone, and a plurality of standardized gaskets separating the spaced panels, each of said gaskets extending at least from seal-to-seal along the edge of the adjacent panel. When one views different longitudinal sections facing in the same direction, through the assembly, the outline of a panel is seen, resting at two points against the seals, and these gaskets are seen extending from seal to seal along the side of the panel appearing in that view. In some of these views, these gaskets appear to extend clockwise along the panel side from a given seal to the other seal, and in other views facing in the same direction the gaskets appear to extend counterclockwise from the same given seal to the same other seal. Where parallel flow is desired, all the gaskets may be of this type, alternately disposed clockwise and counterclockwise from seal-to-seal between adjacent panels. Where and to the extent that series flow through several panels is desired, some intermediate gaskets are peripheral, extending from seal-to-seal, in both directions. Standard components of such panels and gasket sub-assemblies may be fabricated and stocked in a variety of shapes and sizes, making it possible to assemble, in any given housing, any variety of panels and flow patterns.

BRIEF DESCRIPTION OF THE DRAWINGS

FIGS. 1 through 5 illustrate an embodiment of my invention constructed of three pairs of square air purifier panel adsorbers, the air flowing through the two panels of each pair in series, but with respect to the three pairs of panels the air flow is in parallel.

FIG. 1 is an isometric "exploded view" of the order and arrangement of the panels, gaskets and barriers comprising the components of two sets of pairs of panels; the third pair (not shown) would be the same as the other two. Any number of additional sets of panels and gaskets can be added, as desired for the particular purpose. In the actual assembled construction, the gaskets and panels would not be separated.

FIGS. 2, 3, and 4 are cross sectional views taken at the zones II—II, III—III and IV—IV indicated in FIG. 1, showing besides the panels and gaskets, the housing in which the components of FIG. 1 are assembled between the longitudinal sealing strips A and B (engaging the components at the corners correspondingly market A' and B' in FIG. 1). The housing in FIG. 2 is shown on one side only, the opposite side not being enclosed, but it may be provided on both sides if and when desired.

FIG. 5 is a side elevation of the adsorber assembly, as seen from the open side (i.e. in the direction indicated by V—V in FIGS. 2, 3, and 4). In this view the panels, gaskets and barriers appear in their assembled positions. The embodiment illustrated in FIG. 5 includes all the panels and gaskets shown in FIG. 1 and also an additional "third pair" of panels mentioned in the brief description of FIG. 1.

FIG. 6 illustrates an embodiment similar to FIG. 1, but providing two single air purifiers and gaskets, the air flow being in parallel through the single adsorbers.

FIGS. 7 and 8 illustrate my invention as it might be practiced using circular shaped panels, while FIGS. 7 and 9 are sections taken at zones corresponding to FIG. 2 for square panels, while FIGS. 8 and 10 similarly correspond to FIG. 4.

DETAILED DESCRIPTION

Figure 7:
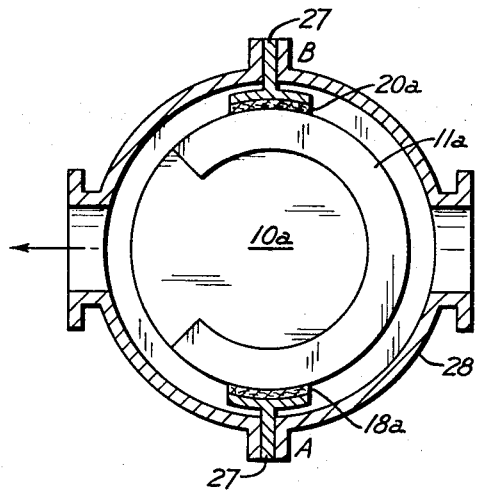

Referring to FIGS. 1 through 5, the adsorber illustrated consists of a stack of panels 10 separated by gaskets 11 and 12, assembled in a housing 13 between a pair of longitudinal seals A and B, contacting the panels at the diagonally opposite corners A' and B'. Two types of gaskets are shown, namely an L-shaped gasket 11 and a peripheral square gasket 12. The peripheral square gaskets 12 are assembled between two panels 10 thus providing series flow through that pair of panels. The L-shaped gaskets 11 are assembled adjacent the opposite faces of the panels of each such pair between the seals A and B, providing parallel fluid flow through the several pairs of panels 10 separated by the peripheral gaskets 12. As shown in FIGS. 2 and 4, the L-shaped gaskets 11 for each pair extend from A to B in opposite directions as seen from the same point of view; i.e., the gasket 11 at one side of each pair as seen in FIG. 4 extends from A to B in a counterclockwise direction while the gasket 11 at the opposite side of the same pair of panels 10 extends from A to B in a clockwise direction as shown in FIG. 2. Abutting the gaskets 11 at the opposite ends of the stack of panels, impervious barriers 14, conveniently made of a sheet of metal, wood, or other impervious material and having substantially the same shape as the adsorber panels 10, may be provided.

Referring particularly to FIG. 5, when viewing the assembled panels and gaskets in the housing from the open inlet side, one sees the exposed top and side panels of the stack. These planes are the sidewalls (the outside surface of the stack) defined by the peripheral edges of the panels 10. Except at the two zones marked "INLET," no opening through these planes into the interior of the stack of panels is seen, since the panels 10 and gaskets 11 and 12 are all flush with these planes where marked with reference numerals in FIG. 5. The two zones marked "INLET," however, are at sections of the stack illustrated by FIG. 4 where the gaskets 11 are on the opposite edges of the panels, providing openings through the exposed top and side planes between adjacent panels 10 for entry of fluid into the stack.

The panels 10 are shown as square panels, typical of commercially available panels comprised of a peripheral frame around a fluid treating filling through which the fluid flows transversely. The term "panel" as used herein comprehends a wide variety of constructions surrounded by the frame, for diverse fluid treatment purposes such as adsorbing, filtering, catalysis, heat exchange, etc., and different types of panels 10 may be assembled in the same stack.

In the embodiment illustrated by FIGS. 1 - 5, for example, both panels 10 of each pair separated by the rectangular gaskets 12 may be identical but it is also contemplated that they may be different, as one panel being a filter and the other a heat exchanger.

When the panel is used to heat or to cool, the fluid flowing transversely therethrough, the "filling" may be a nest or coil of fin tubes or other heat exchange construction. When the panel is used for adsorbing, filtering, or catalysis, the opposite faces thereof may be a wire or plastic screen and the filling between the screens may be activated charcoal, fiber, catalyst, or other fluid treating material. The panels 10 in the figures are shown relatively thin but they may be of any desired thickness. When the filling is in the form of a planar blanket, a common commercial form, the panel thickness and the blanket thickness will be the same, typically in the order of about one inch. In another commercially available construction comprehended by the term "panel" as used in this application, the filling may be a thin bed or blanket folded back and forth in corrugated fashion, thus confining a thin bed of relatively large area in a panel of substantially less lateral area. The thickness of such folded-bed panels is determined by the depth of the folds and typically varies from the order of about two inches to about twenty-four inches in commercially available panels. In still a third construction contemplated by the term "panel" as used herein, the bed itself may be relatively thick and the panel correspondingly relatively wider than the thin panels shown in FIGS. 1 - 5. Because adsorption, catalysis, etc., are generally exothermic or endothermic reactions, it is not uncommon in commercially available panels to provide heat exchange coils therein in addition to the filling of adsorbent or catalyst.

The housing 13 embraces the series of panels at its end and has an outlet nozzle 15 which may, for example, be connected to the suction side of a fan delivering purified air to the duct work through which it is distributed to such rooms or other chambers. The housing may conveniently be provided with flanges 16 extending from end to end on each side, to which the seals A and B are fastened. Seal A consists of a metal bar 17 of Y-shaped cross section in which the tail of the Y is secured to the lower flange 16 of the housing, and an L-shaped felt pad 18 extending end-to-end of the bar 17 in the top angle of the Y of bar 17, thus providing a padded, angle-shaped ledge on which the corners A' of the adsorber panels, gaskets and barriers in FIG. 1 rest. Seal B consists of a metal bar 19 secured to the opposite flange 16 of the housing 13, formed to extend into the housing a short distance parallel to the vertical edges of the panels, and a felt pad 20 extending lengthwise of the bar 19 against which rest the corners (B' in FIG. 1) of the panels, gaskets and barrier plates.

Spacer blocks 21 may be provided, if desired, at the corners of those adsorber panels 10 which are not contacted by the L-shaped gaskets 11.

The air enters the purifier from the opposite side of the seals A and B, at the two zones of the assembly shown in FIG. 4 (sec. IV—IV in FIG. 1), marked "INLET" in FIG. 5. The L-shaped gasket 11 between seals A and B bars transverse flow of the air at this zone directly to the outlet and the adjacent barrier 14 bars longitudinal flow on one side, directing the air through one pair of adsorber panels. The peripheral gasket 12 between the panels 10 of each pair confines the air to flow through both adsorber air series. The purified air leaving the panels is directed towards the housing outlet by the L-shaped gasket 11 between seals A and B and by the impervious barrier 14, as shown in FIG. 2 (Sec. AA in FIG. 1).

In the above described figures I have shown gaskets 11 of uniform thickness, the panels 10 all being parallel. This, however, is of course not essential; it is obviously permissible for the gaskets 11 to be tapered and the panels 10 to be inclined at an angle to one another, the inlets and outlets between panels being correspondingly tapered.

FIG. 6 is an exploded view similar to FIG. 1, showing rectangular adsorber panels 10 with L-shaped gaskets 11 on each side thereof providing parallel flow through all the panels. Only two panels 10 are shown, but the series may obviously be repeated to add as many panels as desired to be operated in parallel.

In FIG. 6, two sub-assemblies providing an integral structure including both the L-shaped gasket 11 and the corner spacer 21 are also illustrated. One of these, generally indicated by the reference numeral 23, consists of a rectangular frame 24 made of channel sectional shape of metal or plastic material, in one corner of which is lodged the spacer 21 and along the two opposite sides of which the L-shaped gasket 11 is lodged. As illustrated in FIG. 6, the gasket 11 extends above and beyond the depth and width of the channel-shaped frame 24 to provide a sealing surface against the adjoining panel 10 when assembled as shown. The web portion of the channel frame 23, along both sides adjacent to the corner spacer, are perforated with holes 25 to permit fluid flow, into or out of the frame, along the two sides not sealed by the gaskets 11. The frame-enclosed assembly 23 thus constitutes an integral article of manufacture which can be stocked in standardized sizes, providing sub-assemblies of the L-shaped gasket and corner spacers, and of course these elements in the FIG. 1 assembly (sections II-II), may be shop-assembled in such a frame 23.

The other sub-assembly illustrated in FIG. 6 consists of pairs of corner spacers 21 and L-shaped gaskets 11d assembled on opposite sides of a barrier plate 14 (indicated by the bracket 26 above these components in the drawing). The corner spacers 21 are on opposite sides of diagonally-opposite corners of the barrier plate 14 while the L-shaped gaskets 11d extend along opposite edges of the plate on opposite sides thereof. As illustrated in FIG. 6, one gasket 11d extends along a first portion of the edges of the barrier plate 14 on one side thereof, and the other gasket 11d extends along a second portion of said edges on the opposite side of the barrier plate 14. The combined length of both gaskets 11d, as shown in FIG. 6, equals the peripheral length of the edges of the barrier plate 14. The corner spacer gaskets 21 in FIG. 6 are shown thicker than the L-shaped gaskets 11d, the latter having about half this thickness at each end thereof and tapering to a relatively narrow width at the corner, such that when these gaskets are assembled with a barrier plate 14 the outside faces of the gaskets 11d and 21 would lie in substantially parallel planes separated by the thickness of a corner spacer 21 plus the thickness of the barrier plate. The barrier plate 14 thus lies in a plane inclined to the plane of the outside faces of these gaskets. Such tapering of the L-shaped gaskets serves to permit the width of the assembly of pairs of such gaskets and a barrier plate to be no more than that of a single L-shaped gasket 11 as shown in FIG. 1; it is not an essential feature of the sub-combination 26 but is the embodiment I perfer for standardized shop-assembled articles of manufacture for practice of my invention. The gaskets may be assembled on opposite sides of the barrier plate in any convenient manner, such as, for example, being cemented thereto or by means of a peripheral channel similar to the frame 24, except that when used in a sub-assembly 26 the web of the frame channel would be perforated on all four sides. This sub-assembly is used only between panels 10 (or sets of such panels in series) through which parallel flow is desired.

Figure 8:
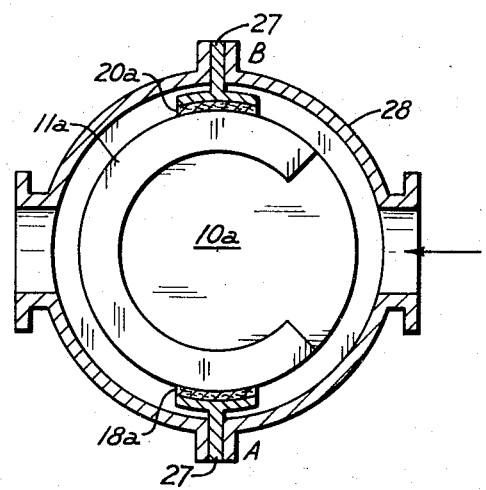

In the circular panel embodiment illustrated in FIGS. 7 and 8, the seals A and B are shown at the opposite ends of the vertical diameter through the panels. These seals may conveniently be made of felt pads 18a and 20a resting against longitudinal T-bars 27 which are bolted between the flanges of the two-piece housing 28. The arc-shaped peripheral gaskets 11a extend, clockwise from seal A to seal B in FIG. 8 and counterclockwise from seal A to seal B in FIG. 7, as do the L-shaped gaskets in FIGS. 4 and 2. These gaskets are alterately disposed on opposite sides of a circular panel 10a to provide parallel flow. Where series flow is desired, full-circle peripheral gaskets (not shown), similar to the rectangular gasket 12, would of course be used as previously described in connection with the set of rectangular panels.

Figure 9:
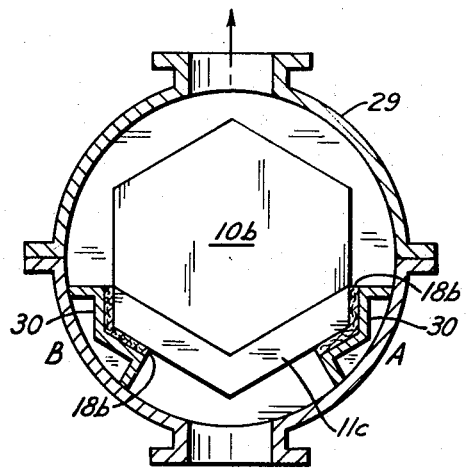
FIGS. 9 and 10 show hexagonal shaped panels.
Figure 10:
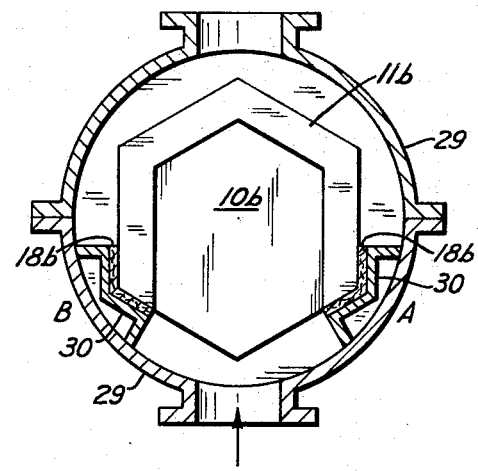

In the hexagonal panel embodiment illustrated in FIGS. 9 and 10, the seals A and B are on opposite sides of the lower part of the housing 29, providing a rest or seat for the hexagonal panels 10b at the corners at the bottom or the vertical sides of the hexagons. These seals consist of felt pads 18b resting against M-shaped longitudinal bars 30 welded to the housing wall from end to end. The gaskets corresponding to the L-shaped gasket 11 in this embodiment are not, however, identical. The peripheral gasket 11b seen extending clockwise from seal A to seal B in FIG. 10 must pass around four sides of the hexagonal panels 10b whereas the peripheral gasket 11c seen extending counterclockwise from the seal A to seal B in FIG. 9 need pass around only two sides of the hexagonal panels 10b, since the seals A and B are not diagonally opposite in this illustrated example of one embodiment of my invention.

It is obvious that the same general gasket and seal arrangement shown in FIGS. 7 – 10 is not dependent upon the shape of the panels, and can be used with panels which have rectangular or any other polygonal shape.

Figure 11:
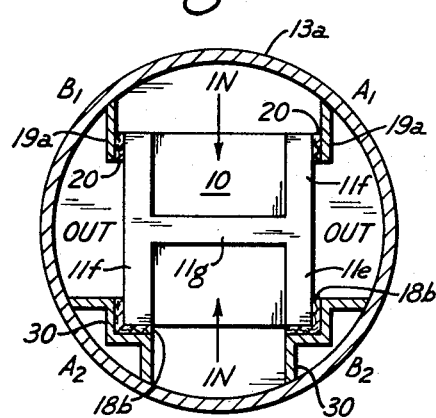
FIGS. 11 and 12 are cross sectional views through adjacent sections of a stack or series of square panels in a cylindrical housing, arranged to provide parallel inlet and outlet passages on opposite sides of the stacks of panels.
Figure 12:
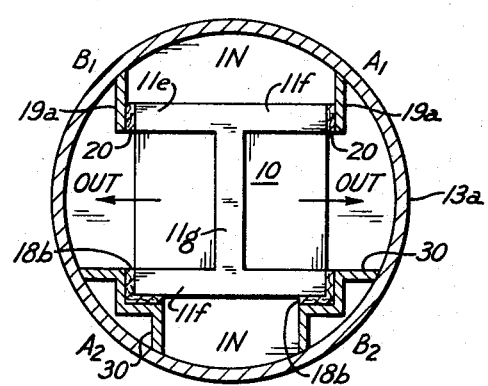

FIGS. 11 and 12 illustrate still another arrangement particularly adapted for square or rectangular panels. These figures are cross-sections taken adjacent two successive panels 10, in a stack of a plurality of panels and gaskets repeating the same order. The housing 13a in this embodiment is a cylinder divided into four longitudinal channels by pairs of seals $A_1$, $B_1$ and $A_2$, $B_2$. The notation for the seals in these figures conforms to the principle followed in FIGS. 2, 3, and 4, namely the "A" seals are diagonally opposite and the "B" seals are also diagonally opposite, but since in this embodiment there are two pairs of seals instead of one, in FIGS. 11 and 12 the seals $A_1$ and $A_2$ are at the ends of one diagonal of the panels 10 while the seals $B_1$ and $B_2$ are at the ends of the other diagonal of the panels. All the square or rectangular panels 10 of the stack rest at their corners against these seals, which may be comprised of longitudinal bars 19a and felt pads 20 at the top (seals $A_1$ and $B_1$) and M-shaped bars 30 with felt pads 18b at the bottom (seals $A_2$ and $B_2$). The top and bottom channels between the seals are marked "IN" in FIGS. 11 and 12 and communicate with one another by a transverse inlet duct (not shown) located at the end of the stack or any other convenient place in the housing 13a. The two lateral channels between the seals are marked "OUT" in the figures; these likewise communicate with one another by a transverse outlet duct (not shown). The direction of fluid flow of course, is immaterial and the pairs of ducts marked "IN" and "OUT" could obviously have been labelled "OUT" and "IN" if the reverse flow were desired.

Between and abutting adjacent panels 10, in this embodiment I provide H-shaped gaskets 11e, each having two parallel sections 11f extending between the corner seals of a pair and a single inert spacer section 11g. The lateral gasket sections 11f, are the ones fulfilling the regular gasket function. The central spacer section 11g serves to connect the sections 11f into an integral article of manufacture 11e congruent with a given size of panel 10, and also to equalize flow from and to oppositely disposed "IN" and "OUT" channels by splitting the accessible face area of the panels from the opposite channels into substantially equal halves (the area occupied by the spacer 11g being negligible). These H-shaped gasket members are alternately disposed with the H erect and the H on its side, as seen in the sectional views. The gasket function members 11f thus go between seals $A_1$ and $B_2$ on one side and between $A_2$ and $B_1$ on the opposite side, in clockwise direction as viewed in FIG. 11, whereas in next adjacent section they pass between $A_1$ and $B_1$, and $A_2$ and $B_2$ in the counterclockwise direction as seen in FIG. 14, viewed in the same direction as in FIG. 12.

It is immaterial whether the housing 13a be cylindrical in form and any other shape desired may, of course, be used.

The fluid flow in this embodiment is from the "IN" channels, which act as manifolds extending along opposite sides of the stack of panels 10, into the spaces between panels separated by the erect H-shaped gaskets 11f as shown in FIG. 11, thence through these adjacent panels into the spaces between the next adjacent panels separated by the H-shaped gasket on its side (FIG. 12), and out into the two "OUT" manifolds on each side of the stack of panels. The flow above described is thus parallel flow through all the panels 10. To the extent that series flow may be desired, peripheral rectangular gaskets 12 may be subsituted for H-shaped gaskets between such panels as are operated in series.

The presently preferred embodiment of my invention is the one with rectangular shaped plane panels, which are now commercially available in various sizes, thicknesses, and fluid treating materials. These materials may be, for example, activated carbon, fibrous filter material, silica gel or other adsorbent. But my invention, broadly, is not limited to any particular shape of panel and may be practiced in any embodiment within the scope of the following claims.

I claim:

1. In combination, congruent spaced-apart fluid treatment panels arranged in a stack with opposite ends and sidewalls; the peripheral edges of said panels, in stacked array, defining said sidewalls of said stack extending between said opposite ends; gasket sealing means constructed and arranged between said spaced-apart panels so that fluid inlet openings are provided into said stack between said spaced-apart panels along said sidewalls within a first side of said stacked array; gasket sealing means constructed and arranged between said spaced-apart panels so that fluid outlet openings are provided from within said stack between said spaced-apart panels along said sidewalls within a second side of said stack; said second side being oppositely arranged from said first side of said stacked array of panels whereby at least one fluid treatment panel is located between a fluid inlet opening and a fluid outlet opening of said stacked array of panels; stack sidewall longitudinal sealing and supporting means contacting said panels and said gasket sealing means between said opposide ends of said stack at the junctions of said first side and said second side and holding said panels in stacked array, comprised of a first longitudinal supporting means extending between said opposite ends of said stack at a first junction of said first and said second sides and a sealing pad extending the length of said first longitudinal supporting means and located between said supporting means and said sidewalls of said stack and a second longitudinal supporting means extending between said opposite ends of said stack at a second junction of said first and second sides and a sealing pad extending the length of said second longitudinal supporting means and located between said supporting means and said sidewalls of said stack.

2. The combination as set forth in claim 1, further characterized in that said panels are rectangular, said stack sidewall longitudinal sealing and supporting means are at opposite ends of one diagonal through the rectangular panels, and said at least one and first and second mentioned gasket sealing means are L-shaped extending along two sides of the adjacent panel.

3. The combination as set forth in claim 2, further characterized by intermediate gasket sealing means between at least two plane parallel rectangular panels being continuous around all four sides of said panels providing series fluid flow through said at least two panels.

4. The combination as set forth in claim 2, further characterized in that all said gasket sealing means are L-shaped and alternate gasket sealing means are arranged so that fluid inlet openings are provided on one side of each panel and fluid outlet openings are provided on the other side of each panel, providing parallel flow through all panels from said first side to said second side.

5. An integral spacer frame and gasket article of manufacture for sealing assembly between filter panels comprising: a rectangular continuous frame of channel shaped cross section with the open side of said channel facing the interior of said rectangular frame; openings in said channel shaped section for fluid flow through said rectangular frame in a first portion of said channel whereby fluid flow between the interior and exterior of said article is provided; a gasket embraced and secured within said channel section frame along a second portion of said channel, said gasket extending above and beyond the depth and width of said channel whereby sealing is provided.

6. An integral barrier plate and gasket assembly for use between filter panels comprising: a rectangular shaped, fluid impervious flat plate; a first gasket secured to one side of said flat plate along a first portion of the edges thereof; a second gasket secured to the opposite side of said flat plate along a second portion of the edges thereof, said gaskets constructed and arranged, oppositely positioned whereby their combined length is equal to the peripheral length of the edges of said plate.

* * * * *